Patented Dec. 18, 1923.

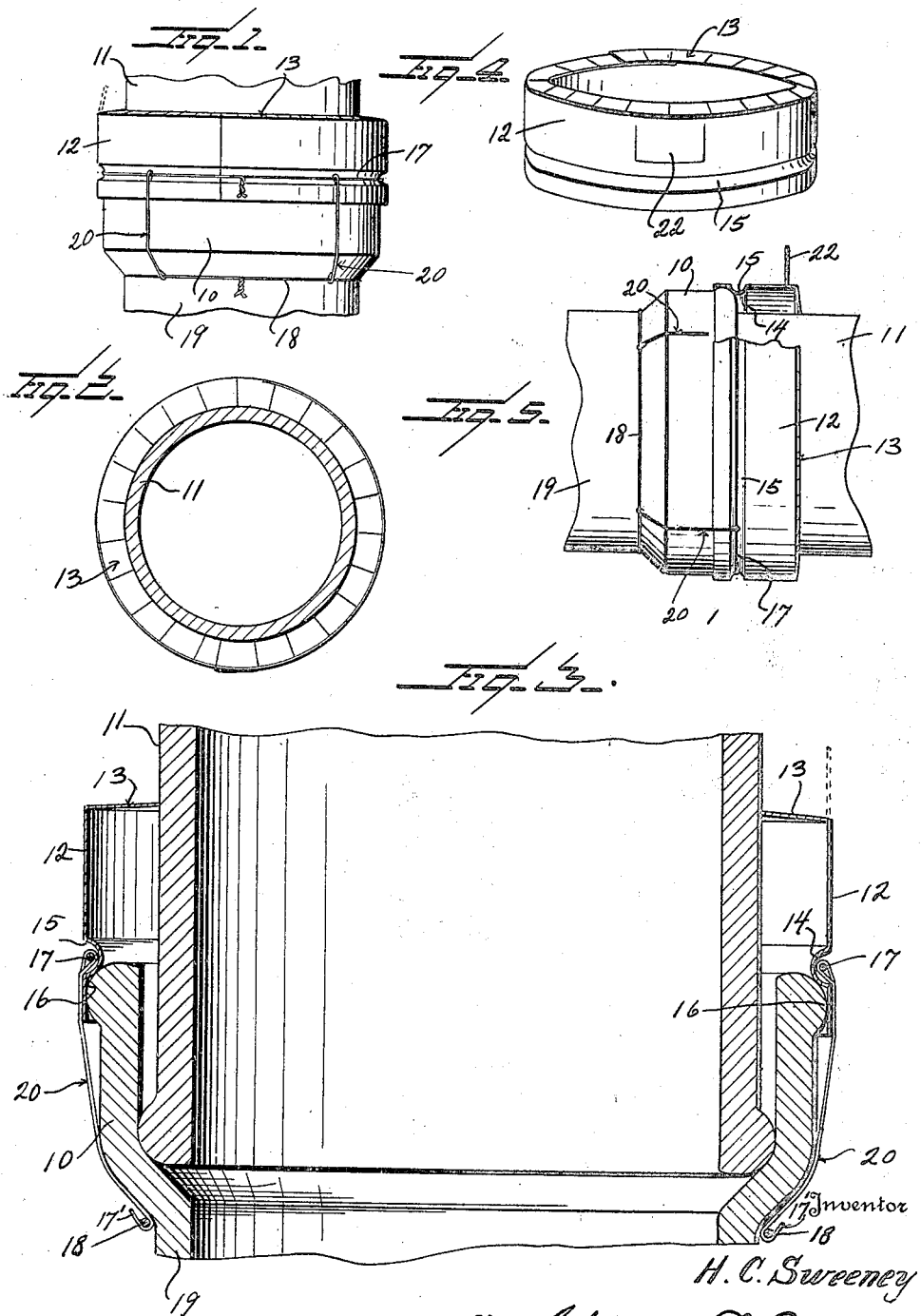

1,477,607

UNITED STATES PATENT OFFICE.

HUGH CASSERLY SWEENEY, OF MINNEAPOLIS, MINNESOTA.

COUPLING GUARD.

Application filed July 31, 1922. Serial No. 578,756.

*To all whom it may concern:*

Be it known that I, HUGH C. SWEENEY, a citizen of the United States, residing at Minneapolis, in the county of Hennepin and State of Minnesota, have invented certain new and useful Improvements in Coupling Guards, of which the following is a specification, reference being had to the accompanying drawings.

This invention relates to coupling guards for sewer pipes, and an important object of the invention is to provide a guard for use upon the couplings of sewer pipes for preventing the entrance of roots of trees and the like from entering the coupling and clogging the sewer.

A further object of the invention is to provide a device of this character formed of a single sheet of material and which may be readily applied to the coupling.

A still further object of the invention is to provide a device of this character which forms a mold permitting the pouring of cement or the like about the joint for the protection thereof.

These and other objects I accomplish by the construction and arrangement shown in the accompanying drawings wherein for the purpose of illustration is shown a preferred embodiment of my invention and wherein like reference characters designate like parts throughout.

In the drawings:—

Figure 1 is a side elevation showing a vertical coupling having a guard constructed in accordance with my invention applied thereto;

Figure 2 is a plan view thereof;

Figure 3 is an enlarged vertical sectional view taken therethrough;

Figure 4 is a perspective view of the guard detached; and

Figure 5 is a side elevation partially broken away showing the guard applied to a horizontal coupling.

As is well known to those familiar with the art, the usual sewer coupling consists of a hub 10 formed at one end of a length of pipe and receiving therein the adjacent end 11 of a second section of pipe. The hub is of greater internal diameter than the external diameter of the pipe which it receives and a packing of any suitable character (not herein shown) is forced into the space between the pipes, packing the joint therebetween. Through this packing the roots of trees, etc., often force their way, forming a mat on the interior of the sewer against which passing sewage collects providing nourishment for the roots which continue to grow finally clogging the sewer.

In accordance with my invention I provide a guard comprising a continuous strip of metal 12 bent in circular form and provided at its upper end with a flange 13 which is segmented, the various segments being independently movable. Adjacent the opposite end the flange has formed upon the inner surface thereof a shoulder 14, preferably provided by forming a beading groove 15 in the metal.

In the application of the device, the band 12 is slipped upon the hub from the open end thereof, after the coupling of the hub and end section 11 have been completed, until the shoulder 14 comes into engagement with the bead 16 of the hub. A wire 17 is then passed about the groove 15 and tightened therein, forcing the band 12 into close engagement with the bead of the hub and causing the segmented flange 13 to tightly engage throughout its length with the surface of the end 11 of the second section of pipe. A second band of wire 18 is then secured about the hub bearing pipe section at the junction of the hub with the pipe proper, as indicated at 19, and these two wires are connected by connecting wires 20, these connecting wires being preferably secured to the wire 17 and provided at their free ends with hooks 17' receiving the wire 18. With the protector in position, one or more of the segments of the flange 13, if the coupling be a vertical one, may be opened and cement poured in the opening thus formed to cover the joint and fill the space between the protector and pipe. If the coupling be a horizontal one, it will, of course, be impractical to force concrete in the protector through one of the segments and I accordingly provide the band 12 in its face with a flap 22 cut at three sides and which may be opened to permit the pouring of the cementitious mixture into the protector when such horizontal coupling is employed.

It will be seen that a device constructed in accordance with my invention not only affords a protection in itself to prevent the entrance of roots in the sewer pipe but permits of its use as a mold whereby the solution of concrete may be poured about the joint to harden. This concrete or cement will effectually protected against breakage by the protector during filling of the trench in which the sewer pipes are laid. It will furthermore be obvious that the same may be readily applied to a coupling after the same has been completed and being formed from a single continuous strip of metal, the application may be made by a single workman. Many changes being possible in the shaping of the protector hereinbefore described and in the manner of application thereof, I do not wish to be understood as limiting myself to the specific arrangement hereinbefore set forth except as hereinafter claimed.

I claim:—

1. A protector for sewer pipe couplings comprising a continuous strip of metal in circular form provided at one end with a flange and at the opposite end with an internal shoulder, and means for attaching the strip in position upon a coupling.

2. A protector for sewer pipe couplings comprising a continuous strip of metal in circular form provided at one end with a flange and at the opposite end with an internal shoulder, and means for attaching the strip in position upon a coupling, said protector having openings permitting the introduction thereto of a plastic composition.

3. A protector for sewer pipe couplings comprising a strip of metal bent in circular form and provided at one end with an inwardly directed segmental flange and adjacent the other end upon its internal surface with a shoulder adapted to engage against the bead of the coupling hub.

4. A protector for sewer pipe couplings comprising a strip of metal bent in circular form and provided at one end with an inwardly directed segmental flange and adjacent the other end upon its internal surface with a shoulder adapted to engage against the bead of the coupling hub, said strip being provided in the body thereof with a flap which may be opened to permit the introduction of a plastic composition.

5. A protector for a hub coupling of sewer pipes comprising a continuous strip of metal in circular form provided at one end with a flange and at the opposite end upon its inner face with a shoulder adapted to abut against the end of the hub, the shoulder being struck out from the metal and forming upon the exterior of the protector an annular groove for the reception of a binding wire.

6. A protector for the hub couplings of sewer pipes in which the hub of the coupling is provided with a bead comprising a strip of metal in circular form provided at one end with a flange and adjacent to the opposite end with a shoulder adapted to abut the end of the hub; said shoulder being formed by bending the metal of the strip and affording upon the exterior of the protector a groove for the reception of a binding wire, whereby, the portion of the protector adjacent the shoulder and remote from the flanged edge of the protector with relation thereto may be forced into engagement with the outer surface of the bead of the hub.

In testimony whereof I hereunto affix my signature.

HUGH CASSERLY SWEENEY.